June 21, 1938.  B. ENGELS  2,121,143
METHOD OF FEEDING MOLTEN GLASS
Filed Aug. 3, 1935
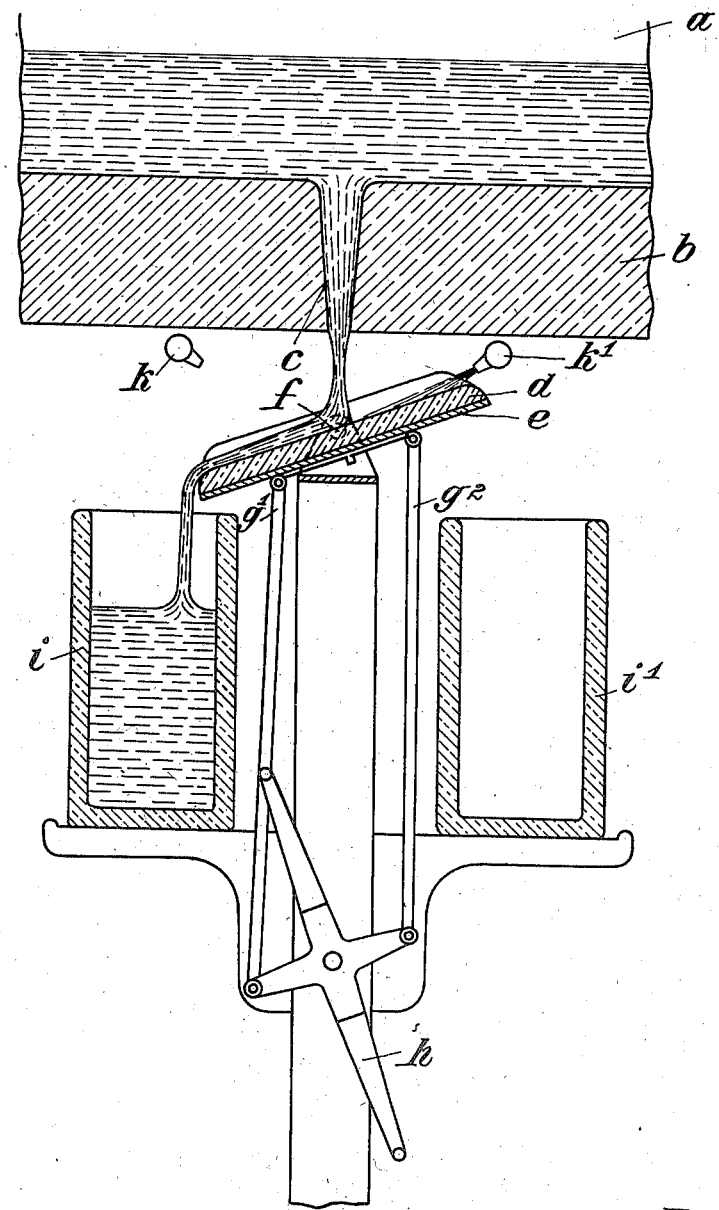
Inventor:
Bernhard Engels
By Owen & Owen Patented June 21, 1938

2,121,143

UNITED STATES PATENT OFFICE 2,121,143

METHOD OF FEEDING MOLTEN GLASS

Bernhard Engels, Waldenburg-Altwasser, Germany

Application August 3, 1935, Serial No. 34,592
In Germany August 6, 1934

4 Claims. (Cl. 49—77)

This invention relates to a method and device for feeding measured quantities of molten glass into molds or other receptacles.

A large number of proposals has been made to solve the problem indicated above, which is of extraordinary importance to the glass industry, but practically all of them suggest to remove the glass intermittently in batches from the receptacle, or permit them to flow out of it, so that after each discharge of a certain amount of glass the stream of the latter has to be interrupted or the outlet closed. Owing to the special working conditions involved and, in particular, the necessity of preventing premature solidification of the glass requiring the use of temperature maintaining devices at the shut-off point, etc., devices operating in the manner described are necessarily of complex design. Besides, the known devices of this class are, as a rule, adapted only for separating relatively small amounts of glass.

There are, further, feeding devices known, in which a tiltable guide member controls the flow of glass and passes it successively to different molds, but in spite of their comparatively complex construction they also require a temporary interruption of the stream of glass, so that a buffer container has to be interposed between the supply vessel and the guiding member for taking up the glass flowing out of the supply vessel during the interruption.

Compared with existing devices, the invention permits to fill molds or other receptacles with definite amounts of molten glass without interrupting the stream of glass continuously flowing out of the supply vessel and still to attain very accurate division of the amounts.

The extraordinary advantages afforded by the invention with respect to simplifying the entire procedure as well as to preventing clogging, the formation of streaks, etc. and automatically maintaining a constant temperature at the outlet are obvious.

The new method according to the invention consists in causing the stream of molten glass continuously coming out of the reservoir to flow into the molds or receptacles over a tilting groove-like guiding device disposed under the outlet opening of the reservoir and having two outlets symmetrically arranged relative to the tip shaft positioned vertically below the outlet opening, the tilting device being alternately brought into one or the other tilting position by suitable means and thus, at the moment of tilting, guiding the amount of glass present in the groove directly in the direction of the next receptacle. The guiding device consists preferably of a simple groove or trough of fireproof material, which is mounted on an iron plate or the like and can be tilted about the tip shaft by operating rods connected therewith. Below the edges of the ends of the tilting trough in both end positions thereof two vessels are arranged for charging, the inclination of the trough in tilting position being preferably just great enough to insure a uniform downward flow of glass owing to the force of gravity.

When the tilting groove is in one of its two operating positions and the respective receptacle has been filled to the desired degree by the liquid glass flowing out of the reservoir and over the groove, the latter is tilted by means of the operating rods to bring its other end into charging position relative to the receptacle disposed on the opposite side and to fill it. Charging of the first receptacle will stop the moment the groove is tilted, as the glass contained therein together with the glass constantly coming out of the reservoir during the tilting process will flow by gravity towards the other side to fill the second receptacle. In this way, the amount of glass to be separated can be exactly proportioned, and particularly so if the distance between the glass level in the receptacle to be filled and the outlet edge of the tilting groove is as short as possible at completion of the filling. But even in case of somewhat greater distances it is merely a matter of practice to tilt the groove at the exact moment when the glass having passed over the edge but having not yet reached the level in the receptacle will suffice for completely filling the latter. Since the continuity of flow of the glass stream coming out of the reservoir insures the outflow of the same amount of glass per unit of time, it is further possible to provide for the automatic reversal of tilting after a certain period, though it is equally possible, for instance, to control the tilting operation by the weight of the filled receptacles.

To protect the glass in the tilting groove against cooling or an undesirable reduction in temperature, the groove may be suitably heated, for instance by a pair of burners arranged on both sides of the ends of the groove and preferably at the bottom of the reservoir, the burners being controlled according to the tilting operation so as to always have the burner work which is nearest the upper end of the tilting groove. The flame of the respective burner is preferably directed obliquely towards the tilting groove, or approximately parallel thereto, to heat the portion of the groove free from glass during the time when it is not heated by the freshly outcoming hot glass up to the point in the center of the groove where the flowing glass meets it.

The receptacles to be filled may be arranged in any suitable manner. For example, they may be disposed on a rotary table in such a way that by rotating the table after each charging operation a new receptacle will be placed in filling position.

By way of example, the invention is illustrated in the accompanying drawing in which the figure is a diagrammatic view in elevation and partly in vertical section showing an apparatus for feeding measured quantities of molten glass alternately to one receptacle and then another.

Referring to the drawing, $a$ is the reservoir containing the molten glass and having a bottom $b$ of fireproof material provided with the outlet opening $c$. $d$ is the tilting groove, also made of fireproof material, which rests on the iron plate $e$ and can be tilted about the shaft $f$. The shaft $f$ is arranged exactly vertically under the center of the opening $c$, and this center or the point where the liquid glass meets the groove $d$ lies in the longitudinal axis of symmetry thereof or in one-half of the width of the groove. $g^1$ and $g^2$ designate the operating rods which, by means of the lever $h$, are actuated to bring the groove $d$ into one or the other tilting position. $i$ and $i^1$ are receptacles, the receptacle $i$ being in charging position in the illustration shown. The stream of molten glass flowing into the receptacle is indicated diagrammatically. $k$ and $k^1$ are oil burners and directed obliquely towards the groove $d$, the burner $k^1$ being in operation as shown. When the groove $d$ is tilted, the burner $k^1$ will be stopped and the burner $k$ started at the same time.

The invention is of course not limited to the embodiment shown and described, but may be varied in different ways without departing from the scope thereof.

Such variations are possible particularly with respect to the form of the tilting guiding device which, for instance, may also have the shape of an elongated bowl or the like, although, at present, the form of a groove having a flat or slightly curved bottom has been found to be the most suitable.

Furthermore, the outlet opening for the stream of molten glass need not necessarily be provided at the bottom of the reservoir, but may be arranged differently. To insure the discharge of a constant amount of molten glass for a given unit of time it is also possible for example to exert pressure upon the mass of glass contained in the receptacle.

I claim:—

1. The method of feeding molten glass which consists in directing a continuous stream of molten glass upon the central portion of a surface extending in directly opposite directions from said central portion, and tilting the surface to deflect the glass in one direction and then in the opposite direction.

2. The method of feeding molten glass which consists in directing a continuous stream of molten glass upon the central portion of a surface extending in directly opposite directions from said central portion, tilting the surface to deflect the glass in one direction and then in the opposite direction, and applying heat recurrently to that portion of the surface tilted away from glass-engaging position.

3. The method of feeding molten glass which consists in directing a continuous stream of molten glass upon the central portion of a surface extending in directly opposite directions from said central portion, tilting the surface to deflect the glass in one direction and then in the opposite direction and alternately applying heat to one end of the surface or the other when in raised position.

4. The method of feeding molten glass which consists in directing a continuous stream of molten glass upon the central portion of a straight trough, and tilting the trough to deflect the glass and discharge it from first one end of the trough and then from the other end of the trough.

BERNHARD ENGELS.